(12) United States Patent
Wiest et al.

(10) Patent No.: US 10,378,939 B2
(45) Date of Patent: Aug. 13, 2019

(54) METHOD FOR MANUFACTURING A SOUND TRANSDUCER FOR A FIELD DEVICE OF AUTOMATION TECHNOLOGY

(71) Applicant: Endress+Hauser Flowtec AG, Reinach (CH)

(72) Inventors: Achim Wiest, Weil am Rhein (DE); Andreas Berger, Hasel-Glashütten (DE)

(73) Assignee: Endress+Hauser Flowtec AG, Reinach (CH)

( * ) Notice: Subject to any disclaimer, the term of this patent is extended or adjusted under 35 U.S.C. 154(b) by 105 days.

(21) Appl. No.: 15/544,564

(22) PCT Filed: Dec. 7, 2015

(86) PCT No.: PCT/EP2015/078802
§ 371 (c)(1),
(2) Date: Jul. 19, 2017

(87) PCT Pub. No.: WO2016/116203
PCT Pub. Date: Jul. 28, 2016

(65) Prior Publication Data
US 2018/0003536 A1    Jan. 4, 2018

(30) Foreign Application Priority Data
Jan. 19, 2015    (DE) .......................... 10 2015 100 670

(51) Int. Cl.
*H04R 31/00* (2006.01)
*G01F 1/66* (2006.01)
(Continued)

(52) U.S. Cl.
CPC ................ *G01F 1/662* (2013.01); *B06B 3/04* (2013.01); *G10K 11/004* (2013.01); *G10K 11/30* (2013.01); *Y10T 29/49005* (2015.01)

(58) Field of Classification Search
CPC ...... G01F 1/662; G10K 11/004; G10K 11/30; B06B 3/04; Y10T 29/49005; Y10T 29/49133
(Continued)

(56) References Cited

U.S. PATENT DOCUMENTS 3,379,902 A    4/1968  Harris et al.
4,195,517 A    4/1980  Kalinoski et al.
(Continued)

FOREIGN PATENT DOCUMENTS

CN    101477085 A    7/2009
CN    101965232 A    2/2011
(Continued)

OTHER PUBLICATIONS

Search Report for German Patent Application No. 10 2015 100 670.7, German Patent Office, dated Aug. 10, 2015, 5 pp.
(Continued)

*Primary Examiner* — Donghai D Nguyen
(74) *Attorney, Agent, or Firm* — Kelly J. Smith; PatServe

(57) ABSTRACT

The present disclosure relates to a method for manufacturing an ultrasonic transducer by exciting the sound wave via an electromechanical transducer disposed on a sensor body, determining a current propagation velocity of the sound wave on an exit surface of the sensor body, determining the difference between the current propagation velocity and the desired propagation velocity of the sound wave on the exit surface, determining difference between speed of sound in the sensor body and a desired speed of sound, removing material in the region of the exit surface of the sensor body, wherein the remaining material is dimensioned such that the current propagation speed of the sound wave on the exit surface of the sensor body, and/or the delay caused by the speed of sound in the sensor body, at least approximately
(Continued)

agrees with the desired propagation speed of the sound wave on the exit surface.

12 Claims, 3 Drawing Sheets

(51) Int. Cl.
    *B06B 3/04*     (2006.01)
    *G10K 11/30*     (2006.01)
    *G10K 11/00*     (2006.01)

(58) Field of Classification Search
    USPC .......................................... 29/594, 832, 834
    See application file for complete search history.

(56) References Cited

U.S. PATENT DOCUMENTS

| | | | | |
|---|---|---|---|---|
| 6,788,620 B2* | 9/2004 | Shiraishi | ................ | G10K 11/02 310/334 |
| 7,412,902 B2* | 8/2008 | Wiest | ...................... | G01F 1/662 73/861.25 |
| 2006/0156828 A1 | 7/2006 | Konzelmann et al. | | |
| 2010/0250151 A1 | 9/2010 | Rager et al. | | |
| 2014/0020478 A1 | 1/2014 | Ao et al. | | |

FOREIGN PATENT DOCUMENTS

| | | |
|---|---|---|
| DE | 3241200 A1 | 5/1984 |
| DE | 10221771 A1 | 11/2003 |
| DE | 102005057888 A1 | 6/2007 |
| DE | 102010063535 A1 | 6/2012 |
| WO | 9641157 | 12/1996 |
| WO | 0239069 A2 | 5/2002 |

OTHER PUBLICATIONS

Search Report for International Patent Application No. PCT/EP2015/ 078802, WIPO, dated Apr. 15, 2016, 10 pp.

\* cited by examiner

METHOD FOR MANUFACTURING A SOUND TRANSDUCER FOR A FIELD DEVICE OF AUTOMATION TECHNOLOGY

CROSS-REFERENCE TO RELATED APPLICATIONS

The present application is related to and claims the priority benefit of German Patent Application No. 10 2015 100 670.7, filed on Jan. 19, 2015 and International Application No. PCT/EP2015/078802, filed Dec. 7, 2015, the entire contents of which are incorporated herein by reference.

Technical Field

The present disclosure relates to a method for manufacturing a sound transducer for a field device of automation technology, wherein the sound transducer comprises a sensor body—also referred to as a lead-in element and an electromechanical transducer, which is arranged on an outer surface of the sensor body via at least one adapting layer, wherein a sound wave produced by the electromechanical transducer, after passing through the sensor body propagates on an exit surface of the sensor body with a defined desired propagation velocity or wherein a sound wave produced by the electromechanical transducer propagates at a defined desired angle between the normal to the exit surface and the propagation direction in a medium adjoining the exit surface.

Background

Conventional, ultrasonic flow measuring devices work according to the travel-time difference principle. In such case, the different travel times of ultrasonic measurement signals in the flow direction and counter to the flow direction of the medium are evaluated. For this, the ultrasonic measurement signals are transmitted and received by ultrasonic transducers alternately in the flow direction and counter to the flow direction of the medium. From the travel-time difference of the ultrasonic measurement signals, the flow velocity and therewith, in the case of known diameter of the pipeline, the volume flow, and, in the case of known or measured density of the medium, the mass flow can be determined. Preferably, corresponding ultrasonic sensors are applied in flow measuring devices, which contactlessly determine the volume- and/or mass flow of a medium in a pipeline, or in non-destructive testing devices (NDT), thus testing devices working without destroying the test object. As regards types of measuring devices, there are ultrasonic flow measuring devices, which are inserted into the pipeline, and clamp-on flow measuring devices, in the case of which the ultrasonic transducers are pressed externally onto the pipeline by means of a clamping mechanism.

In the case of both types of ultrasonic flow measuring devices, the ultrasonic measurement signals, i.e., the sound waves, are radiated at a predetermined angle and/or received at a predetermined angle into, respectively from, the pipeline or the measuring tube, in which the flowing medium is located. In order to achieve an optimal impedance matching, the ultrasonic measurement signals are in-coupled into the pipeline, respectively out-coupled from the pipeline, via a sensor body, i.e., a coupling element. A main component of an ultrasonic transducer is at least one electromechanical transducer, e.g., a piezoelectric element, which produces and/or receives the ultrasonic measurement signals. The electromechanical element is connected flushly with the sensor body. Preferably, the connection occurs via an adhesive layer.

In order to be able to transmit a sound beam into the medium at a defined angle, the sensor body, i.e., the coupling element, has a defined angle. This angle can be ascertained based on Snell's law of refraction:

$$\frac{\sin\alpha_M}{c_M} = \frac{\sin\alpha_{SB}}{c_{SB}} = const.$$

wherein the following definitions hold:

$\alpha_M$ is the angle from the normal to the interface in the medium;

$\alpha_{SB}$ is the angle from the normal to the exit surface of the sound wave in the sensor body—preferably, this angle is 38° in the case of ultrasonic, flow measuring devices of the applicant;

$c_{SB}$ is the velocity of sound in the sensor body; and $c_M$ is the velocity of sound in the medium.

In order to achieve the desired accuracy of measurement in the case of ultrasonic sensors, both tolerances in the geometric properties as well as also tolerances in the acoustic properties of the materials of the ultrasonic sensor must be kept within narrow limits. A typical clamp-on ultrasonic flow measuring device has a measurement tolerance of about 2% in the case of conventional manufacturing conditions. The tolerances in the geometric properties arise either from angle errors or from fluctuations in the flush connection between electromechanical transducer and sensor body. Fluctuations in the geometric properties are usually due to the manufacturing process performed by the manufacturer. Tolerance fluctuations in acoustic properties can arise from deviations in the composition of the material of the sensor body and the adapting layer. These occur especially from batch to batch. Also, the parameters of the medium however, also the measuring tube stored by the user in a memory of the clamp-on device can influence the accuracy of measurement of the flow measurement.

In order to achieve a higher accuracy of measurement, manufacturers sometimes segregate ultrasonic sensors into quality classes and determine corresponding correction factors for the individual groups. These correction factors are utilized in later application for electronically modifying the measured value in the measuring device. However, practice always deviates from theory, such that correction is never quite completely effective.

SUMMARY

An object of the present disclosure is to provide a method with which tolerances between individual ultrasonic sensors are corrected.

The object is achieved by a method that comprises steps as follows: providing an oversized sensor body; exciting (i.e., emitting) a sound wave via a electromechanical transducer; determining current propagation velocity of the sound wave on an exit surface of the sensor body or determining current angle between the normal to the exit surface and the propagation direction of the sound wave in the medium; determining the difference between the current propagation velocity and the desired propagation velocity of the sound wave on the exit surface of the sensor body or determining the difference between current angle and defined desired angle between the normal to the exit surface and the propagation direction of the sound wave in the medium; determining the difference between the current velocity of sound in the sensor body and the desired velocity of sound; removing material in the region of the exit surface of the sensor body, wherein the remaining material is so dimensioned that the current propagation velocity of the sound wave on the exit surface of the sensor body and/or of the delay by the velocity of sound in the sensor body at least approximately agrees with the desired propagation velocity of the sound wave on the exit surface of the sensor body, or that the current angle between the normal to the exit surface and the propagation direction at least approximately agrees with the defined desired angle between the normal to the exit surface and the propagation direction of the sound wave in the medium. Thus, material along the central axis of the sensor body is removed, until the required travel time in the sensor body is achieved.

With the method of the present disclosure, all deviations from a predetermined desired value influencing the accuracy of measurement can be excluded from the beginning. The measurement error of devices containing ultrasonic sensors manufactured according to the method of the present disclosure is characterized by a smaller and largely constant value in comparison with conventional ultrasonic sensors. Fluctuations in the accuracy of measurement between individual ultrasonic sensors can be prevented. Especially, demands placed on manufacturing methods for producing the ultrasonic sensors at the manufacturer can be reduced, this being a feature which leads to lower manufacturing costs.

In an advantageous embodiment of the method of the present disclosure, a desired travel time of the sound wave in the sensor body is predetermined based on the desired sound velocity, wherein the remaining material is so dimensioned that the current travel time at least approximately agrees with the predetermined desired travel time of the sound wave in the sensor body. For use of the ultrasonic transducer in the case of flow measuring devices working according to the travel-time difference method, this is naturally very important.

Especially in this connection, it is provided that a desired travel time of the sound wave in the sensor body is predetermined, wherein the electromechanical transducer is shifted along the outer surface of the sensor body, until the current travel time at least approximately agrees with the predetermined desired travel time of the sound signal in the sensor body. It is evident from FIG. 1 that shifting of the electromechanical transducer along the lateral surface can vary the distance of the sound waves through the sensor body. This embodiment limits the removing of material, thus, to a fitting of the angle of the sensor body.

An advantageous embodiment of the method of the present disclosure provides that the current propagation velocity of the sound wave on the exit surface of the sensor body is ascertained optically, for example, via an interferometer. Alternatively, it is provided that the current propagation velocity of the sound wave on the exit surface of the sensor body is determined via an array of electromechanical transducers, wherein the array is so dimensioned and/or arranged that it samples at least one portion of the exit surface, in which the sound wave propagates. An alternative solution provides that the current propagation velocity of the sound wave on the exit surface of the sensor body is determined via at least one electromechanical transducer, wherein the electromechanical transducer is moved along at least one portion of the exit surface, in which the sound wave propagates. In the first case, of concern is a parallel sampling, in the second case a serial sampling.

In an additional variant of the method of the present disclosure, the current angle between the normal to the exit surface and the propagation direction of the sound wave in the medium is determined acoustically by means of a hydrophone. Alternatively, the current angle between the normal to the exit surface and the propagation direction of the sound wave in the medium is determined via an array of electromechanical transducers, wherein the array is so dimensioned and/or arranged that it samples at least one portion of the angular range, in which the sound wave propagates in the medium. Alternatively, it is provided that the current angle between the normal to the exit surface and the propagation direction of the sound wave in the medium is determined via at least one electromechanical transducer, wherein the electromechanical transducer is shifted at least in a portion of the angular range, in which the sound wave propagates.

Preferably, the material to be removed is mechanically removed. For example, the material to be removed is milled off and/or ground off. The removal process occurs preferably directly after corresponding calculating of the material to be removed, for instances, of the material wedge to be removed.

As already mentioned above, the ultrasonic transducer manufactured according to the method of the present disclosure may be used for a flow measuring device or for a testing sensor working without destruction of the material being tested, a testing sensor applied, e.g., for material testing.

BRIEF DESCRIPTION OF THE DRAWINGS

The present disclosure will now be explained in greater detail based on the appended drawing, the figures of which show as follows.

DETAILED DESCRIPTION

Figure 1:
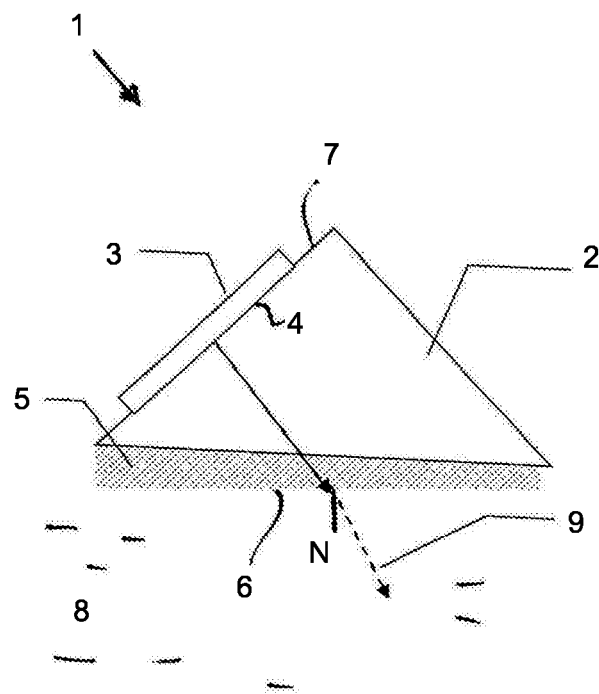
FIG. 1 shows a side view of an ultrasonic sensor before the method of the present disclosure is applied.
Figure 2:
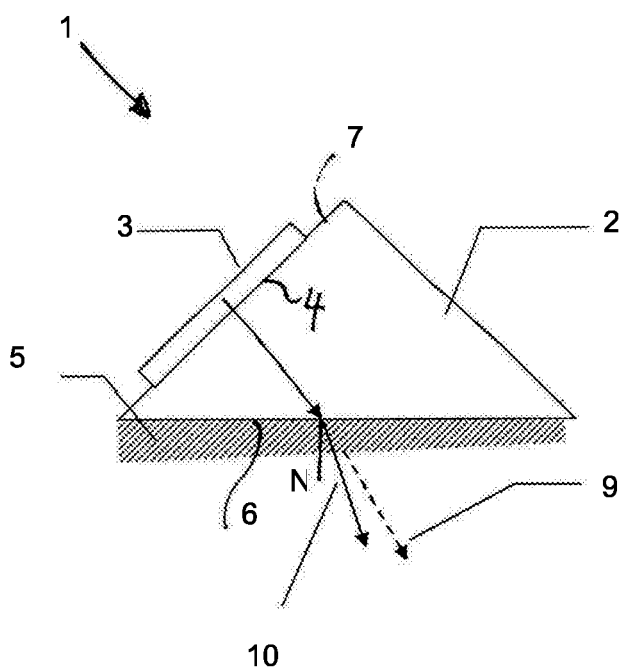
FIG. 2 shows a side view of the ultrasonic sensor manufactured according to the method of the present disclosure.

FIG. 1 shows a side view of an ultrasonic sensor 1 before the method of the present disclosure is applied. Shown is thus an ultrasonic sensor 1, which has an oversized sensor body, or lead-in element. FIG. 2 shows a side view of the corresponding ultrasonic sensor 1 manufactured according to the method of the present disclosure.

Ultrasonic sensor 1 comprises a sensor body 2, or lead-in element. Sensor body 2 is also sometimes called a coupling element. Secured on a lateral surface 7 of the sensor body 2 via an adapting layer 4 is an electromechanical transducer 3. Reference character 5 designates the material, which must be removed in the illustrated case of the sensor body 2, in order that the current, actual exit angle and the desired exit angle between a normal N to the exit surface 6 and the propagation direction of the sound wave in the medium 8 at least approximately agree.

In order to avoid the removing of greater amounts of material along the central axis of the sensor body 2 and nevertheless to assure that the distance to be traversed by the sound wave in the sensor body 2 is optimal, the electromechanical transducer 3 can be shifted along the lateral surface 7 into a suitable position. In the suitable position, the current, actual velocity of sound in the sensor body 2 corresponds at least approximately to the desired velocity of sound. In this correct position, the flush connection of electromechanical transducer 3 and sensor body 2 is effected via the adapting layer 4.

Furthermore, the current propagation velocity of the sound wave on the exit surface 6 of the sensor body 2 is determined. Alternatively, the current angle between the normal N to the exit surface 6 and the propagation direction of the sound wave in the medium 8 is ascertained. Then, the difference between current propagation velocity and desired propagation velocity of the sound wave on the exit surface 6 of the sensor body 2, or the difference between current angle and defined desired angle between the normal N to the exit surface 6 and the propagation direction of the sound wave in the medium 8 is determined.

The grinding or milling off of material 5 in the region of the exit surface 6 of the sensor body 2 is so dimensioned that the current propagation velocity of the sound wave on the exit surface 6 of the sensor body 2 and/or of the delay resulting from the velocity of sound in the sensor body 2 at least approximately agrees with the desired propagation velocity of the sound wave on the exit surface 6 of the sensor body 2. Alternatively, the removal of material 5 occurs in such a manner that the current angle between the normal N to the exit surface 6 and the propagation direction at least approximately agrees with the defined desired angle between the normal N to the exit surface 6 and the propagation direction of the sound wave in the medium 8. In FIG. 1 and in FIG. 2, the original sound beam, i.e., the original sound wave, in the case of oversized sensor body 2 not manufactured according to the present disclosure, is designated with the reference character 9. In FIG. 2, the sound wave, or sound beam, which occurs on the "corrected" exit surface 6 after the correction via the method of the present disclosure, is designated with the reference character 10. As evident from FIG. 2, the exit angle of the sound beam relative to the normal N on the exit surface 8 can be suitably modified by means of the method of the present disclosure. The method of the present disclosure can improve the accuracy of measurement of ultrasonic flow measuring devices because fluctuations arising between individual ultrasonic sensors 1 as a result of tolerances in the acoustic and/or geometric properties of the materials are compensated, or cancelled.

Figure 3:
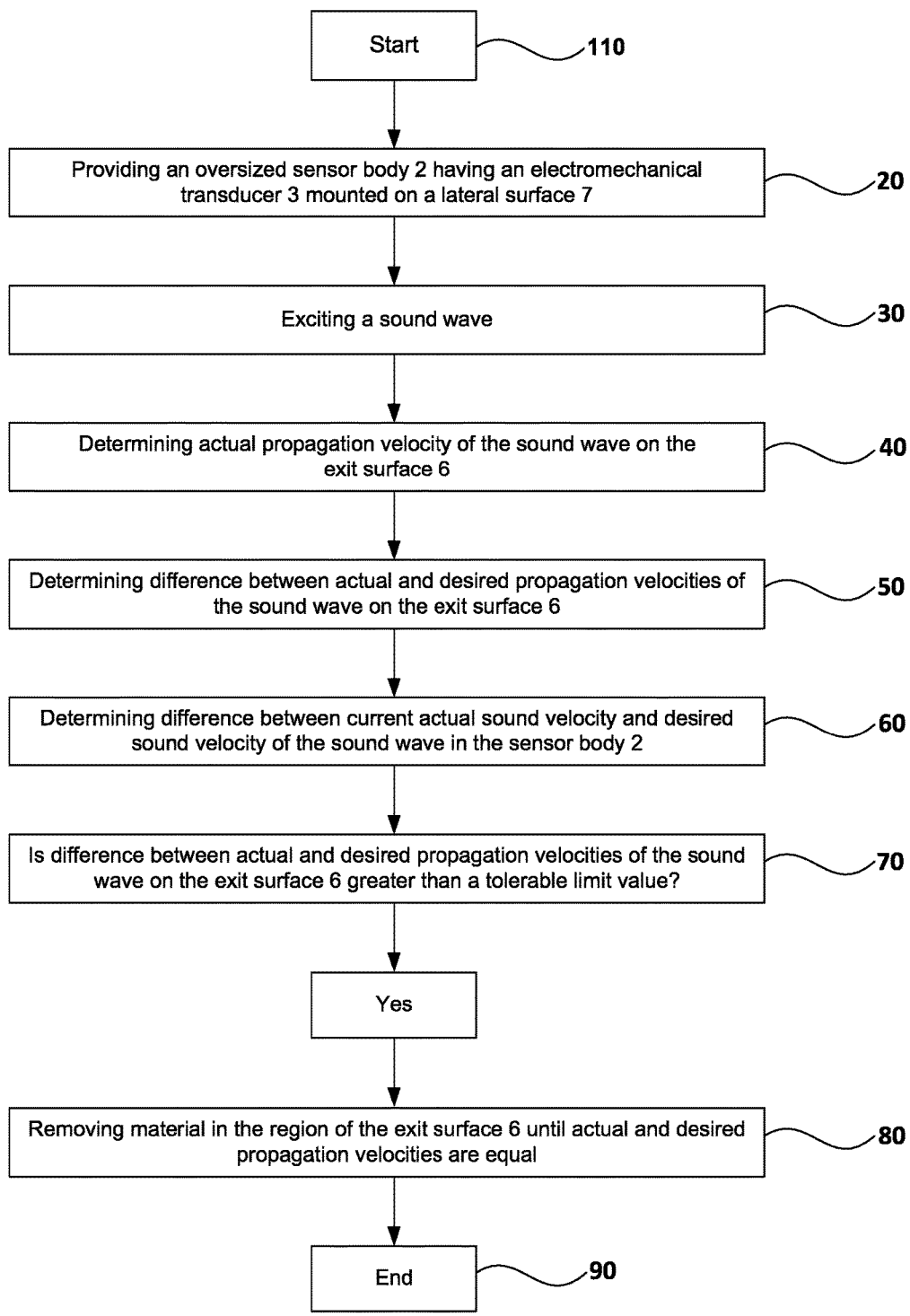
FIG. 3 shows a flow diagram of a first embodiment of the method of the present disclosure for manufacturing an ultrasonic sensor.

FIG. 3 shows a flow diagram, which illustrates the individual steps of a first embodiment of the method of the present disclosure for manufacturing an ultrasonic sensor 1. After the start at step 100, an oversized sensor body 2 having an electromechanical transducer 3 mounted on a lateral surface 7 is provided at step 20. Then, at step 30, at least one sound wave is excited with a defined frequency via at least one electrical signal.

At step 40, the actual propagation velocity of the sound wave on the exit surface 6 of the sensor body 2 is determined. For this, one of the above mentioned methods may be applied. At step 50, difference between actual and desired propagation velocities of the sound wave on the exit surface 6 is determined. At step 60, difference between the current velocity of sound and the desired velocity of sound of the sound wave in the sensor body 2 is ascertained. This measurement may be implemented via a time measurement. If the difference between the actual and the desired propagation velocities of the sound wave on the exit surface 6 is greater than a tolerable limit value, then, at step 80, material in the region of the exit surface 6 is removed, until the actual and the desired propagation velocities are equal. At step 90, the manufacturing process for a highly optimally manufactured sensor body 2 ends.

Figure 4:
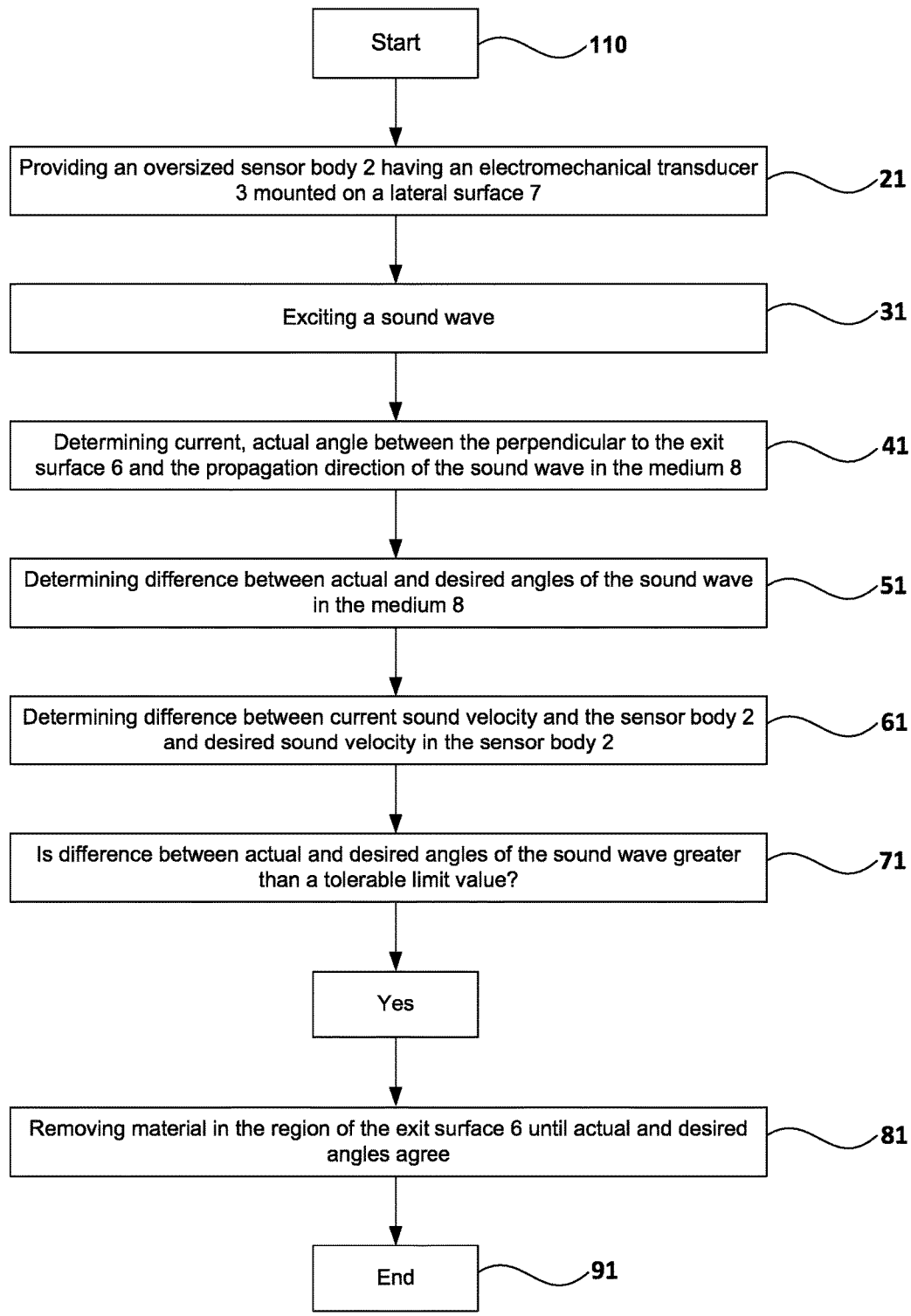
FIG. 4 shows a flow diagram of a second embodiment of the method of the present disclosure for manufacturing an ultrasonic sensor.

FIG. 4 shows a flow diagram, which illustrates the individual steps of a second embodiment of the method of the present disclosure for manufacturing an ultrasonic sensor 1. After the start at step 110, an oversized sensor body 2 having an electromechanical transducer 3 mounted on a lateral surface 7 is provided at step 21. At step 31, a sound wave is excited via the electromechanical transducer 3. At step 41, the current, actual angle between the normal to the exit surface 6 and the propagation direction of the sound wave in the medium 8 is determined. For this, again, one of the above mentioned methods is applied. In at least one embodiment, the angular difference is determined by means of a hydrophone. After determining the difference between the actual and the desired angle of the sound wave in the medium 8 (step 51), at step 61, the difference between the current velocity of sound in the sensor body 2 and the desired velocity of sound in the sensor body 2 is ascertained. If the difference between the actual and the desired angle of the sound wave is greater than a predetermined tolerable limit value, which determined at step 71, then at step 81, material is removed in the region of the exit surface 6, until the actual and the desired angles agree. Then, the method for manufacturing a highly precise sensor body 2 comes to an end at step 91.

The invention claimed is:

1. A method for manufacturing an ultrasonic sensor for a field device of automation technology, the method comprising the steps:
   providing an electromechanical transducer arranged on a lateral surface of an oversized sensor body via at least one adapting layer such that a sound wave produced by the electromechanical transducer, after passing through the sensor body, propagates on an exit surface of the sensor body with a desired propagation velocity, or such that the sound wave produced by the electromechanical transducer propagates at a desired angle to a normal to the exist surface into a medium adjoining the exit surface;
   emitting the sound wave via the electromechanical transducer;
   determining a current propagation velocity of the sound wave on the exit surface or determining a current angle between the normal to the exit surface and a propagation direction of the sound wave in the medium;
   determining the difference between the current propagation velocity and the desired propagation velocity of the sound wave on the exit surface, or determining the difference between the current angle and the desired angle between the normal to the exit surface and the propagation direction of the sound wave in the medium;
   determining the difference between a current velocity of sound in the sensor body and a desired velocity of sound; and
   removing material in a region of the exit surface of the sensor body, wherein the remaining material is dimensioned such that the current propagation velocity of the sound wave on the exit surface of the sensor body, and/or of the delay by the current velocity of sound in the sensor body, at least approximately agrees with the desired propagation velocity of the sound wave on the exit surface, or such that the current angle between the normal to the exit surface and the propagation direction at least approximately agrees with the desired angle between the normal to the exit surface and the propagation direction of the sound wave in the medium.

2. The method of claim 1, wherein a desired travel time of the sound wave in the sensor body is predetermined based on the desired sound velocity, and wherein the remaining material is dimensioned such that a current travel time of the sound wave in the sensor body at least approximately agrees with the predetermined desired travel time of the sound wave in the sensor body.

3. The method of claim 1, wherein a desired travel time of the sound wave in the sensor body is predetermined, and wherein the electromechanical transducer is shifted along the lateral surface of the sensor body until a current travel time of the sound wave in the sensor body at least approximately agrees with the predetermined desired travel time of the sound wave in the sensor body.

4. The method of claim 1, wherein the current propagation velocity of the sound wave on the exit surface of the sensor body is ascertained optically.

5. The method of claim 4, wherein the current propagation velocity of the sound wave on the exit surface is ascertained using an interferometer.

6. The method of claim 1, wherein the current propagation velocity of the sound wave on the exit surface of the sensor body is determined via an array of electromechanical transducers, wherein the array is dimensioned and/or arranged such that the array samples at least one portion of the exit surface in which the sound wave propagates.

7. The method of claim 1, wherein the current propagation velocity of the sound wave on the exit surface of the sensor body is determined via at least one measuring electromechanical transducer is moved along at least one portion of the exit surface in which the sound wave propagates.

8. The method of claim 1, wherein the current angle between the normal to the exit surface and the propagation direction of the sound wave in the medium is determined acoustically using a hydrophone.

9. The method of claim 1, wherein the current angle between the normal to the exit surface and the propagation direction of the sound wave in the medium is determined using an array of electromechanical transducers, wherein the array is dimensioned and/or arranged such that the array samples at least one portion of an angular range through which the sound wave propagates in the medium.

10. The method of claim 1, wherein the current angle between the normal to the exit surface and the propagation direction of the sound wave in the medium is determined using at least one measuring electromechanical transducer, wherein the measuring electromechanical transducer, wherein the measuring electromechanical transducer is shifted at least in a portion of the angular range through which the sound wave propagates.

11. The method of claim 1, wherein the material to be removed is mechanically removed.

12. The method of claim 11, wherein the material to be removed is mechanically removed by grinding.

* * * * *